(12) United States Patent
Panem Jaya et al.

(10) Patent No.: US 11,418,600 B1
(45) Date of Patent: Aug. 16, 2022

(54) SESSION AND SERVICE/FLOW CONTINUITY

(71) Applicant: Cisco Technology, Inc., San Jose, CA (US)

(72) Inventors: Sanjeev Panem Jaya, Maharashtra (IN); Anand Arun Alshi, Maharashtra (IN); Dishant Mukesh Parikh, Gujarat (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 17/121,954

(22) Filed: Dec. 15, 2020

(51) Int. Cl.
*G06F 15/16* (2006.01)
*H04L 67/148* (2022.01)
*H04L 67/141* (2022.01)

(52) U.S. Cl.
CPC .......... *H04L 67/148* (2013.01); *H04L 67/141* (2013.01)

(58) Field of Classification Search
CPC ............................ H04L 67/148; H04L 67/141
See application file for complete search history.

(56) References Cited

U.S. PATENT DOCUMENTS

| | | | | |
|---|---|---|---|---|
| 8,612,612 B1* | 12/2013 | Dukes | ................... | H04L 67/141 709/228 |
| 2017/0237607 A1* | 8/2017 | Smith | ................... | H04L 67/141 709/223 |
| 2017/0251514 A1* | 8/2017 | Soderlund | ........... | H04L 61/2007 |
| 2018/0063752 A1* | 3/2018 | Hahn | ................ | H04W 36/0011 |
| 2018/0198867 A1* | 7/2018 | Dao | ........................ | H04W 76/27 |
| 2018/0227743 A1* | 8/2018 | Faccin | ................ | H04L 65/1069 |
| 2018/0316603 A1* | 11/2018 | Boucadair | .......... | H04B 7/18504 |
| 2019/0007500 A1 | 1/2019 | Kim et al. | | |
| 2019/0059067 A1 | 2/2019 | Lee et al. | | |
| 2019/0098537 A1 | 3/2019 | Qiao et al. | | |
| 2019/0182875 A1* | 6/2019 | Talebi Fard | .......... | H04W 72/04 |
| 2019/0215724 A1 | 7/2019 | Talebi Fard et al. | | |
| 2019/0268960 A1* | 8/2019 | Faccin | .................. | H04W 76/18 |
| 2020/0120549 A1* | 4/2020 | Sun | ........................ | H04W 72/12 |

(Continued)

OTHER PUBLICATIONS

Cisco Systems, "Solution for KI#2: Session continuity in edge relocation scenario", SA WG2 Meeting #140-e, S2-2005856, Aug. 19-Sep. 1, 2020, 4 pages.

(Continued)

*Primary Examiner* — Razu A Miah
(74) *Attorney, Agent, or Firm* — Edell, Shapiro & Finnan, LLC

(57) ABSTRACT

A Session Management Function (SMF) provides session and service continuity for a User Equipment (UE) transitioning between User Plane Functions (UPFs). The SMF establishes a first session between the first UPF and the UE using a first network address. The SMF determines that the UE transitions to the second UPF and establishes a second session between the second UPF and the UE using a second network address for new flows on the second session. The SMF queries the first UPF to determine any ongoing flows in the first session. The first UPF forwards packets in the ongoing flow(s) to the UE via the second UPF. The second UPF forwards packets in the ongoing flow(s) to the first UPF with the first network address. The SMF directs the second UPF to replace the first network address with the second network address in packets of a new flow for the UE.

20 Claims, 8 Drawing Sheets

(56) References Cited

U.S. PATENT DOCUMENTS

2020/0205208 A1* 6/2020 Hu ..................... H04W 76/11
2020/0245381 A1* 7/2020 Talebi Fard .......... H04W 48/00
2020/0374352 A1* 11/2020 Ge ...................... H04W 76/11
2020/0396678 A1* 12/2020 Lee ..................... H04W 8/08

OTHER PUBLICATIONS

3GPP, "3rd Generation Partnership Project; Technical Specification Group Services and System Aspects; Procedures for the 5G System (5GS); Stage 2 (Release 16)", 3GPP TS 23.502 V16.5.1, Aug. 2020, 594 pages.
3GPP, "3rd Generation Partnership Project; Technical Specification Group Services and System Aspects; System architecture for the 5G System (5GS); Stage 2 (Release 16)", 3GPP TS 23.501 V16.5.1, Aug. 2020, 440 pages.

* cited by examiner

in … … …

SESSION AND SERVICE/FLOW CONTINUITY

TECHNICAL FIELD

The present disclosure relates to network management of user sessions, particularly in network deployments with separate user plane and control plane functions.

BACKGROUND

The Third Generation Partnership Project (3GPP) specifications define three modes for Session and Service Continuity (SSC). With SSC mode 1, the network preserves the connectivity service provided to the User Equipment (UE). For the case of Protocol Data Unit (PDU) sessions the Internet Protocol (IP) address is preserved for IPv4, IPv6, or IPv4v6 sessions. With SSC mode 2, the network may release the connectivity service delivered to the UE and release the corresponding PDU session(s). Releasing the PDU session for IPv4, IPv6, or IPv4v6 type releases the IP address(es) allocated to the UE. With SSC mode 3, changes to the user plane are made visible to the UE, and the network ensures that the UE does not suffer a loss of connectivity. A new connection through a new PDU session anchor point is established before the previous connection is terminated, in order to allow for better service continuity. For the IPv4, IPv6, or IPv4v6 sessions, the IP address of the UE is not preserved when the PDU session anchor changes in SSC mode 3.

DESCRIPTION OF EXAMPLE EMBODIMENTS

Overview

Figure 1:
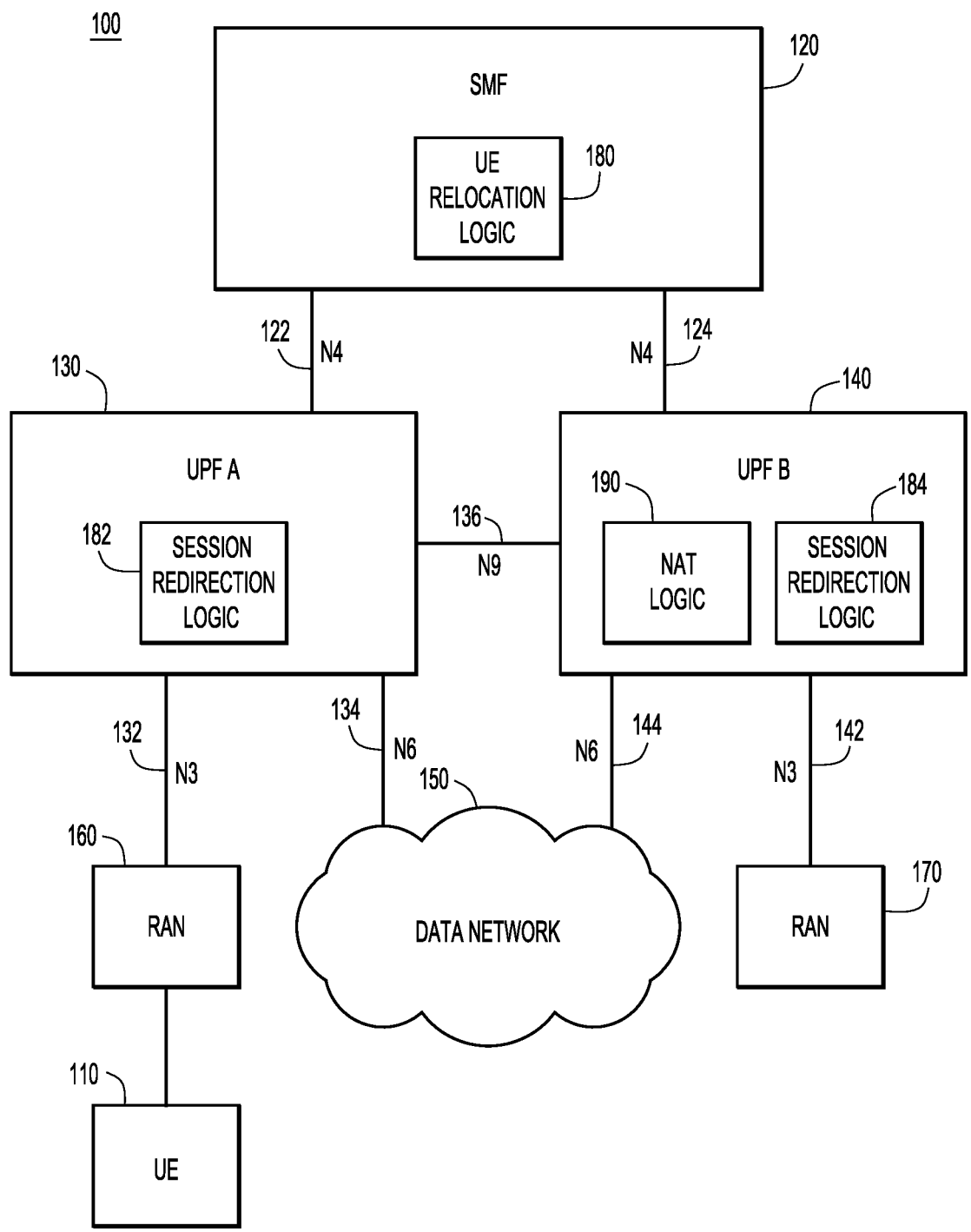
FIG. 1 is a simplified block diagram of a network system, according to an example embodiment.

A computer implemented method is provided for an SMF to provide session and service continuity for a UE transitioning between a first UPF and a second UPF. The method includes establishing a first session between the UE and the first UPF. The first session is associated with a first network address for the UE. The method also includes determining that the UE transitions to the second UPF and establishing a second session between the UE and the second UPF. The second UPF translates new flows in the second session to a second network address. The method further includes querying the first UPF to determine that the UE is participating in at least one ongoing flow in the first session. The method also includes providing the first UPF with first forwarding rules to forward packets in the at least one ongoing flow to the UE via the second UPF, and providing the second UPF with second forwarding rules to forward packets in the at least one ongoing flow to the first UPF with the first network address. The method further includes directing the second UPF to replace the first network address with the second network address in packets of at least one new flow for the UE.

Example Embodiments

The SSC modes as defined by 3GPP specifications (23.501 & 23.502) have limitations that may inhibit the functionality of a network system. For instance, SSC mode 1 requires chained User Plane Functions (UPFs) throughout the life of a session. Additionally, SSC mode 2 causes a service disruption during a transition to a new UPF when the UE releases the session and reconnects to the new UPF with a new IP address. Further, SSC mode 3 requires a UE to support dual IP addresses and dual Public Data Network (PDN) sessions. SSC mode 3 also consumes additional UPF resources as a branching point UPF during the transition from a first UPF to a second UPF.

Due to the release of the UE IP address, SSC mode 2 cannot be used to ensure session and service/flow continuity. SSC mode 1 provides service continuity to the UE, but with inherent inefficiencies. Specifically, SSC mode 1 requires additional UPF resources since UPF chaining is used throughout the life of a session after a mobility event. The UPF chaining requires mesh connectivity between UPFs deployed across the entire network. Additionally, constant UPF chaining increases the use of UPF resources across the entire network, which will cause latency for the flows of all of the UEs in a network.

SSC mode 3 may provide service continuity to a UE, but faces a high resource requirement form the network and the UE. The network is required to provide two IP addresses and three UPFs, i.e., the initial UPF, a branching point UPF, and the final UPF. Additionally, SSC mode 3 is not supported for a UE that is not capable a supporting dual IP addresses and dual PDN sessions. Further, SSC mode 3 does not support UEs using static IP addresses. In addition to these limitations on the network and the UE, SSC mode 3 includes unnecessary inefficiencies that are reduced in the techniques presented herein. Specifically, SSC mode 3 does not ensure that ongoing flows are not disrupted, since the original IP address and PDN session are maintained only until a validity timer expires at the SMF. If the validity timer expires while the ongoing flow persists, the ongoing flow will be disrupted in SSC mode 3. Additionally, SSC mode 3 may occupy resources on the initial UPF until the validity timer expires, even after all of the ongoing flows have been terminated.

The techniques presented herein address the inefficiencies of conventional SSC modes while guaranteeing session and service continuity for a UE session and provides capital expenditure savings for network operators due to fewer UPF resources being used. Additionally, the techniques presented herein provide for efficient use of network addresses required to maintain session continuity. These techniques may be used in Control/User Plane Separation (CUPS) Evolved Packet Core (EPC), as well as Fifth Generation (5G) Stand Alone (SA) or Non-Stand Alone (NSA) deployments, and supports older UE devices that may not support the multiple IP addresses needed for SSC mode 3.

The techniques presented herein provide a single IP address and a single PDN session maintained from the UEs perspective. UEs are not required to support dual IP addresses and/or dual PDN sessions. UPF chaining is used only for the duration of existing flows, with no disruption to ongoing flows. The initial UPF relinquishes resources assigned to the UE only after existing flows are terminated, rather than relying on an inexact validity timer as used in SSC mode 3. With a port-based Network Address Translation (NAT) service on the destination UPF, the same IP address may be shared by multiple UEs as they each transition to the destination UPF. The SMF triggers a session reconnection as soon as the UE becomes idle (i.e., no ongoing flows, not necessarily related to an active/state) to complete the transition to the destination UPF.

Referring now to FIG. 1, a network system 100 that is configured to provide service continuity to a UE 110 is shown. The network system 100 includes a Session Management Function (SMF) 120 configured to manage sessions for the UE 110. The SMF 120 is connected to UPF 130 (i.e., UPF A) and UPF 140 (i.e., UPF B), which are configured to manage user plane data between a Data Network 150 and Radio Access Network (RAN) 160 and RAN 170, respectively. The UE 110 initially connects to the RAN 160 and sets up a session through the associated UPF 130 to the data network 150.

The SMF 120 is connected to the UPF 130 and the UPF 140 by N4 interface connections 122 and 124, respectively. The UPF 130 is connected to the RAN 160 by an N3 interface 132. Additionally, the UPF 130 is connected to the data network 150 by an N6 interface 134. Further, the UPF 130 is connected to the UPF 140 by an N9 interface 136. The UPF 140 is connected to the RAN 170 by an N4 interface 142. Additionally, the UPF 140 is connected to the data network 150 by an N6 interface 144.

The SMF 120 includes UE relocation logic 180 to enable the SMF 120 to detect whether to transition the UE 110 to a different UPF (e.g., UPF 140). The UE relocation logic 180 also enables the SMF 120 to provide a seamless transition for any sessions that the UE 110 may have established with initial UPF (e.g., UPF 130). In one example, the UE 110 may physically move from a location serviced by the UPF 130 to a location serviced by the UPF 140. The UPF 130 includes session redirection logic 182 that is configured to redirect session flows and provide service and session continuity to the UE 110 in coordination with the SMF 120. The UPF 140 also includes session redirection logic 184 that coordinates the session redirection with the SMF 120 and the UPF 130. The UPF 140 also includes a NAT service 190 that is configured to allow the UE 110 to maintain the same IP address when the UE 110 relocates to the UPF 140, as further described hereinafter.

Figure 2A:
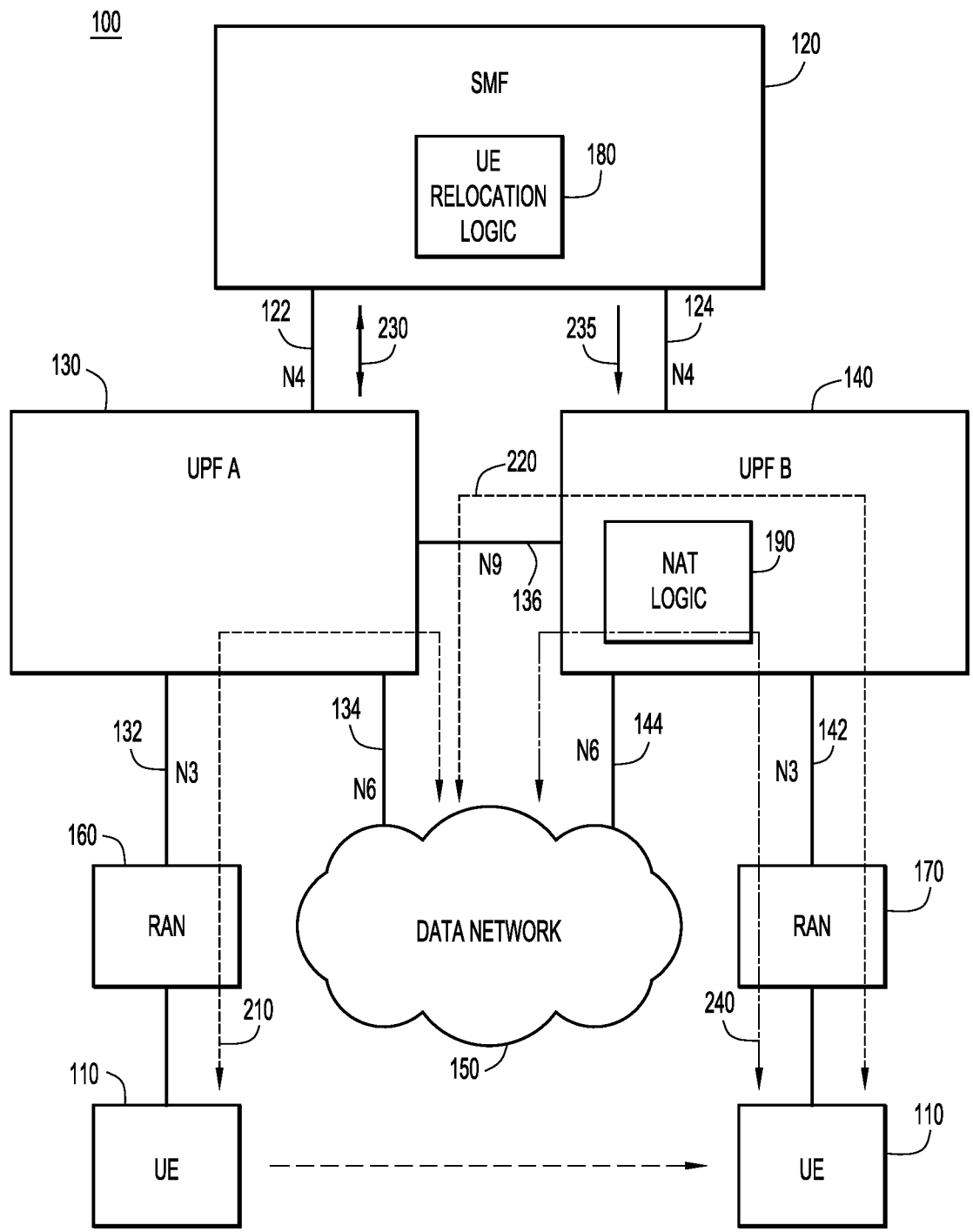
FIG. 2A is a simplified block diagram illustrating the network system maintaining a PDU session with ongoing flows when a UE moves to a new location, according to an example embodiment.

Referring now to FIG. 2A, a simplified block diagram illustrates an example of messages in the network system 100 to enable the UE 110 to maintain service continuity when moving from RAN 160 serviced by UPF 130 to RAN 170 serviced by UPF 140. Initially, the UE 110 connects to the RAN 160 and the SMF 120 directs the associated UPF 130 to establish a session, which includes one or more data flows 210 between the UE 110 and the data network 150. When the UE 110 moves to a different location and connects to the RAN 170, the SMF 120 detects the new location of the UE 110 and selects the destination UPF 140 to provide continued service to the UE 110.

To provide seamless service continuity to the UE 110, the SMF 120 queries the UPF 130 to determine whether the session includes any ongoing flows 220. Through an exchange 230, the UPF 130 may identify any ongoing flows 220 from the flows 210 in the session established on the UPF 130. The SMF 120 directs the UPF 130 to redirect downlink traffic in the ongoing flows 220 from the N3 interface 132 to the N9 interface 136 to the UPF 140. In one example, the exchange 230 may include filters to identify and select the ongoing flows from the session 210.

In another example, the UPF 130 may indicate that there are not ongoing flows 220. In this case, the SMF 120 may direct the UPF 130 to release the session, and send a request to disconnect to the UE 110 with a cause indicating "Reconnection Required." The UE 110 reconnects through the RAN 170 and the SMF establishes a new session on the UPF 140 with an IP address associated with the UPF 140.

The SMF 120 also provides instructions 235 to the UPF 140 that establish a new session for the UE 110. The instructions 235 cause the UPF 140 to redirect uplink traffic in the ongoing flows 220 through the N9 interface 136 to the UPF 130 instead of directly to the data network 150 over the N6 interface 144. In one example, the instructions may include filters to identify the ongoing flows 220. In another example, the instructions 235 cause the UPF 140 to refrain from advertising the network address of the UE 110 (i.e., the IP address assigned by the UPF 130) to ensure that the network address for the ongoing flows 220 remains associated with the UPF 130. Additionally, the instructions 235 cause the UPF 140 to route any new flows 240 for the UE 110 through the NAT service 190 to allow the UE to maintain an IP address assigned in the session with the initial UPF 130. In one example, the NAT service 190 translates the UE IP address to a temporary IP address associated with the UPF 140.

In other words, when the UE 110 transitions from a session on the UPF 130 to a session on the UPF 140, the SMF 120 modifies the existing rules on the UPF 130 to handle uplink packets in the ongoing flows 220 received on the N9 interface 136 and send the uplink packets to the data network on the N6 interface 134. Additionally, the downlink packets in the ongoing flows 220 received from the data network 150 are forwarded to the UPF 140 over the N9 interface 136.

Uplink data in the ongoing flows 220 is passed from the UE 110 through the UPF 140 to the UPF 130 before being sent to the data network 150. Conversely, downlink data is sent from the data network 150 through the UPF 130 to the UPF 140, which forwards the downlink data to the UE 110.

For the new flows 240, uplink data is sent from the UE 110 to the UPF 140 with a source address of the IP address assigned to the UE 110 by the UPF 130. The NAT service 190 in the UPF 140 translates the source address in the uplink data to the temporary IP address before sending the uplink data to the data network 150. Similarly, downlink data in the new flows 240 is sent from the data network 150 to the UPF 140 with a destination address of the temporary IP address. The NAT service 190 in the UPF translates the temporary IP address to the IP address assigned to the UE 110 by the UPF 130 and forwards the downlink data to the UE 110.

Figure 2B:
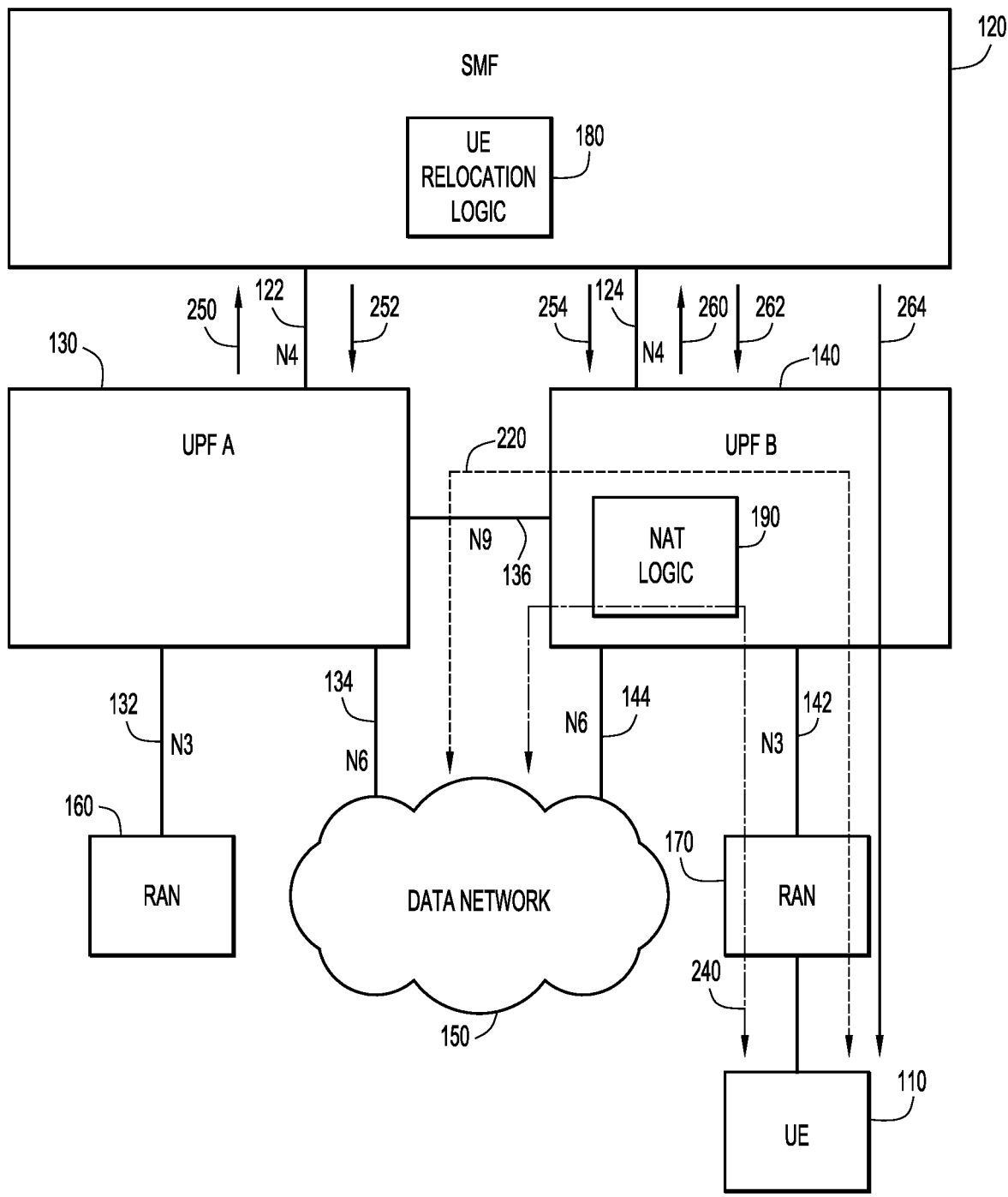
FIG. 2B is a simplified block diagram illustrating the network system handling PDU session at the new location of the UE, according to an example embodiment.

Referring now to FIG. 2B, a simplified system diagram illustrates an example of messages in the system 100 for handling sessions after the UE 110 transitions from the UPF 130 to the UPF 140. Once all of the ongoing flows 220 have ended, the UPF 130 sends a notification 250 to the SMF 120. The SMF 120 sends a message 252 to the UPF 130 with instructions to terminate the session with the UE 110 on the UPF 130. The SMF 120 also sends a message 254 to the UPF 140 to remove the forwarding rules for the ongoing flows 220 (i.e., the forwarding rules to send downlink data of the ongoing flows 220 to the UPF 130 over the N9 interface 136). The UPF 140 continues to maintain the NAT service 190 for the new flows 240 to prevent disruption of the new flows 240.

When the UE 110 is idle and the new flows 240 have ended, the UPF 140 sends a notification 260 to the SMF 120. The SMF 120 sends a message 262 to the UPF 140 that causes the UPF 140 to release the session with the UE 110. The SMF 120 also sends a session release request 264 to UE 110 with cause indicating "Reconnection Required." The UE 110 reconnects to the UPF 140, and the SMF 120 establishes a new session on the UPF 140. The new session may assign the UE 110 a new IP address from a range of IP addresses associated with the UPF 140.

To enable the SMF 120 to query the UPF 130 regarding the status of ongoing flows 220, Information Elements (IEs) for existing Packet Forwarding Control Protocol (PFCP) report request and response message (e.g., messages in the exchange 230) may be used. The PFCP Session Report Request may use modified values for the IE described in Table 1:

TABLE 1

| PFCP Session Report Request IE | | | | | | | |
|---|---|---|---|---|---|---|---|
| Information elements | P | Condition/Comment | Sxa | Sxb | Appl. Sxc | N4 | IE Type |
| Report Type | M | This IE shall indicate the type of the report. | X | X | X | X | Report Type |

The PFCP Session Report Response may be modified with IEs described in Table 2:

TABLE 2

| Modified PFCP Session Report Response IEs | | | | | | | |
|---|---|---|---|---|---|---|---|
| Information elements | P | Condition/Comment | Sxa | Sxb | Appl. Sxc | N4 | IE Type |
| Number of Active Flows | C | This IE shall be present if Number of Active flows with this session. This IE shall be set to "0" when no ongoing active flows are present on the UPF. | — | X | — | X | Number of Active Flows |
| Flow Information | C | When present, this IE shall contain the flow information for the active flows currently present for that session. | — | X | — | X | Flow Information |

To enable the UPF 140 to establish a new session for the UE 110 with the NAT service 190 and enable the UE 110 to maintain the IP address assigned by the UPF 130, the PFCP Session Establishment Request message (e.g., message 235 shown in FIG. 2A) may include the IE described in Table 3:

TABLE 3

| Modified PFCP Session Establishment Request | | | | | | | |
|---|---|---|---|---|---|---|---|
| Information elements | P | Condition/Comment | Sxa | Sxb | Appl. Sxc | N4 | IE Type |
| PFCPSEReq-Flags | C | This IE shall be included if at least one of the flags is set to "1". RESTI (Restoration Indication): this bit shall be set to "1" if the CP function re-establishes an existing PFCP session and the allocation of GTP-U F-TEID and/or UE IP address is performed by the UP function. (NOTE 4) | X | X | — | X | PFCPSEReq-Flags |

Additionally, the Report Type IE may be modified to enable the SMF 120 and UPF 130 to indicate active flows. The modified Report Type IE is shown in Table 4:

TABLE 4

Modified Report Type IE

| Octets | Bits | | | | | | | |
|---|---|---|---|---|---|---|---|---|
| | 8 | 7 | 6 | 5 | 4 | 3 | 2 | 1 |
| 1 to 2 | Type = 39 (decimal) | | | | | | | |
| 3 to 4 | Length = n | | | | | | | |
| 5 | Spare | UISR | SESR | PMIR | UPIR | ERIR | USAR | DLDR |
| 6 | AFQR | AFTR | | | | | | |
| 7 to (n + 4) | These octet(s) is/are present only if explicitly specified | | | | | | | |

In the modified Report Type IE shown in Table 4, octet 6 may be encoded with bit 8 representing the Active Flows query Report. When bit 8 is set to "1" this indicates the IE is a request from the control plane to the user plane for a number of active flows for that session, e.g., as part of the exchange 230 shown in FIG. 2A. Additionally, bit 7 of octet 6 represents the Active Flow Termination Report. When bit 7 is set to "1" this indicates that all active flows for that session are terminated, e.g., in the notification 250 shown in FIG. 2B.

A new IE may be defined to enable the UPF 130 to indicate the number of active flows in response to a query from the SMF 120, e.g., as part of the exchange 230. The new Number of Active Flows IE may be encoded as shown in Table 5:

TABLE 5

New IE for Number of Active Flows

| Octets | Bits | | | | | | | |
|---|---|---|---|---|---|---|---|---|
| | 8 | 7 | 6 | 5 | 4 | 3 | 2 | 1 |
| 1 to 2 | Type = XX (decimal) | | | | | | | |
| 3 to 4 | Length = n | | | | | | | |
| 5 to 8 | Number of Active Flows | | | | | | | |

The PFCPSEReq-Flags IE from the PFCP Session Establishment Request message (e.g., message 235 shown in FIG. 2A) may be modified to enable the SMF 120 to indicate to the UPF 140 that a new session requires a NAT IP address. The modified PFCPSEReq-Flags IE is show in Table 6:

TABLE 6

Modified PFCPSReq-Flags IE

| Octets | Bits | | | | | | | |
|---|---|---|---|---|---|---|---|---|
| | 8 | 7 | 6 | 5 | 4 | 3 | 2 | 1 |
| 1 to 2 | Type = 186 (decimal) | | | | | | | |
| 3 to 4 | Length = n | | | | | | | |
| 5 | Spare | | | | | | NATI | RESTI |
| 6 to (n + 4) | These octet(s) is/are present only if explicitly specified | | | | | | | |

In the modified PFCPSReq-Flags IE, bit 2 of octet 5 represents a NAT Indication. When bit 2 is set to "1" this indicates to the user plane function (e.g., UPF 140) that the PFCP session to be established needs to be allocated a NAT IP address. Additionally, if bit 2 is set to "1" the allocated UE IP address is not advertised.

Figure 3A:
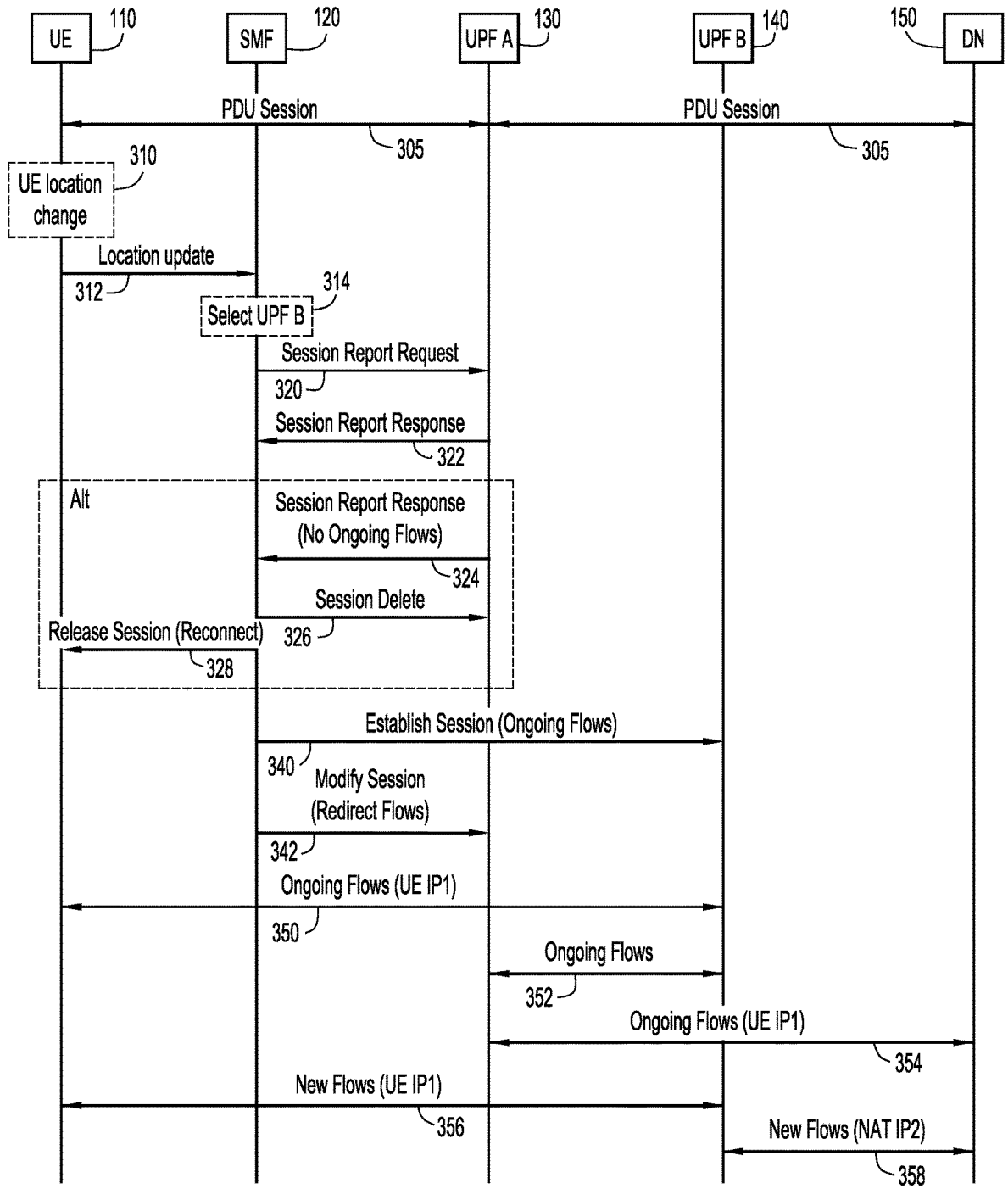
FIG. 3A is a message flow diagram illustrating messages and flows between a UE and a network system to maintain ongoing flows while transitioning the UE to a different User Plane Function (UPF), according to an example embodiment.

Referring now to FIG. 3A, a message flow diagram illustrates messages passed in a network system to transition a UE 110 from a first UPF 130 (i.e., UPF A) to a second UPF 140 (i.e., UPF B). Initially, the UE 110 has established a PDU session 305 on the UPF 130, and may be exchanging data with the data network (DN) 150 on the session 305. At 310, the UE 110 may change access location to an area that is typically serviced by the UPF 140 instead of the UPF 130. The UE 110 sends a location update 312 to the SMF 120, and the SMF 120 selects the UPF 140 at 314 based on the new location of the UE 110.

The SMF 120 sends a session report request 320 to the UPF 130 to determine any ongoing flows in the session 305. The UPF 130 responds with a session report response 322 indicating the ongoing flows in the session 305. Alternatively, if there are no ongoing flows in the session 305, the UPF 130 responds with a session report response 324 that indicates that there are no ongoing flows. If there are no ongoing flows, the SMF 120 sends a session deletion request 326 to the UPF 130. Additionally, the SMF 120 sends a session release request 328 to the UE 110 with an indication for the UE 110 to reconnect. When the UE 110 reconnects, the SMF 120 follows a conventional procedure and directs the appropriate UPF (i.e., UPF 140) to establish a session and provide the connection to the data network 150.

If the UPF 130 indicates in the session report response 322 that there are ongoing flows in the session 305, the SMF 120 sends a session establishment request 340 to the UPF 140. The session establishment request 340 identifies the ongoing flows and directs the UPF 140 to route the ongoing flows through the UPF 130. The session establishment request 340 also directs the UPF 140 to translate the network address (e.g., IP address) of the UE 110 from the network address assigned by the UPF 130 to a temporary network address associated with the UPF 140 before packets are sent to the data network 150.

In one example, the SMF 120 may create new Packet Detection Rule (PDR) or Forwarding Action Rule (FAR) with filters to identify ongoing flows from the UPF 130 and forward uplink packets in the ongoing flows through the N9 interface to the UPF 130. Additionally, the SMF 120 may generate PDR/FARs to handle downlink packets in the ongoing flows received from the UPF 130 over the N9 interface.

In another example, the UPF 140 may allocate a port range to be used with the temporary network address for any new data flows of the UE 110. The UPF 140 may establish a session with the data network 150 that is associated with the temporary network address.

Additionally, the SMF 120 sends a session modification request 342 to the UPF 130 to redirect packets in the ongoing flows through the UPF 140. In one example, the SMF 120 may direct the UPF 130 to modify existing rules to handle uplink packets of the ongoing flows received from the UPF 140 over the N9 interface. The SMF 120 may also direct the UPF 130 to modify existing rules and forward downlink packets of the ongoing flows to the UPF 140 over the N9 interface.

After the UPF 130 and the UPF 140 have been configured by the SMF 120, any ongoing flows 350 from the UE 110 are sent to the UPF 140. The UPF 140 forwards the ongoing flows 352 to the UPF 130, which forwards the ongoing flows 354 to the data network 150. The packets in the ongoing flows maintain the network address (e.g., IP1) assigned to the UE 110 by the UPF 130, causing the data network 150 to send the ongoing flows to the network address associated with the UPF 130. Any new flows 356 from the UE 110 are sent to the UPF 140, which translates the network address (e.g., IP1) of the UE 110 from the network address assigned by the UPF 130 to a network address (e.g., IP2) assigned by the UPF 140. The UPF 140 sends the new flows 358 to the data network 150 with the temporary network address (e.g., IP2) assigned by the UPF 140.

Figure 3B:
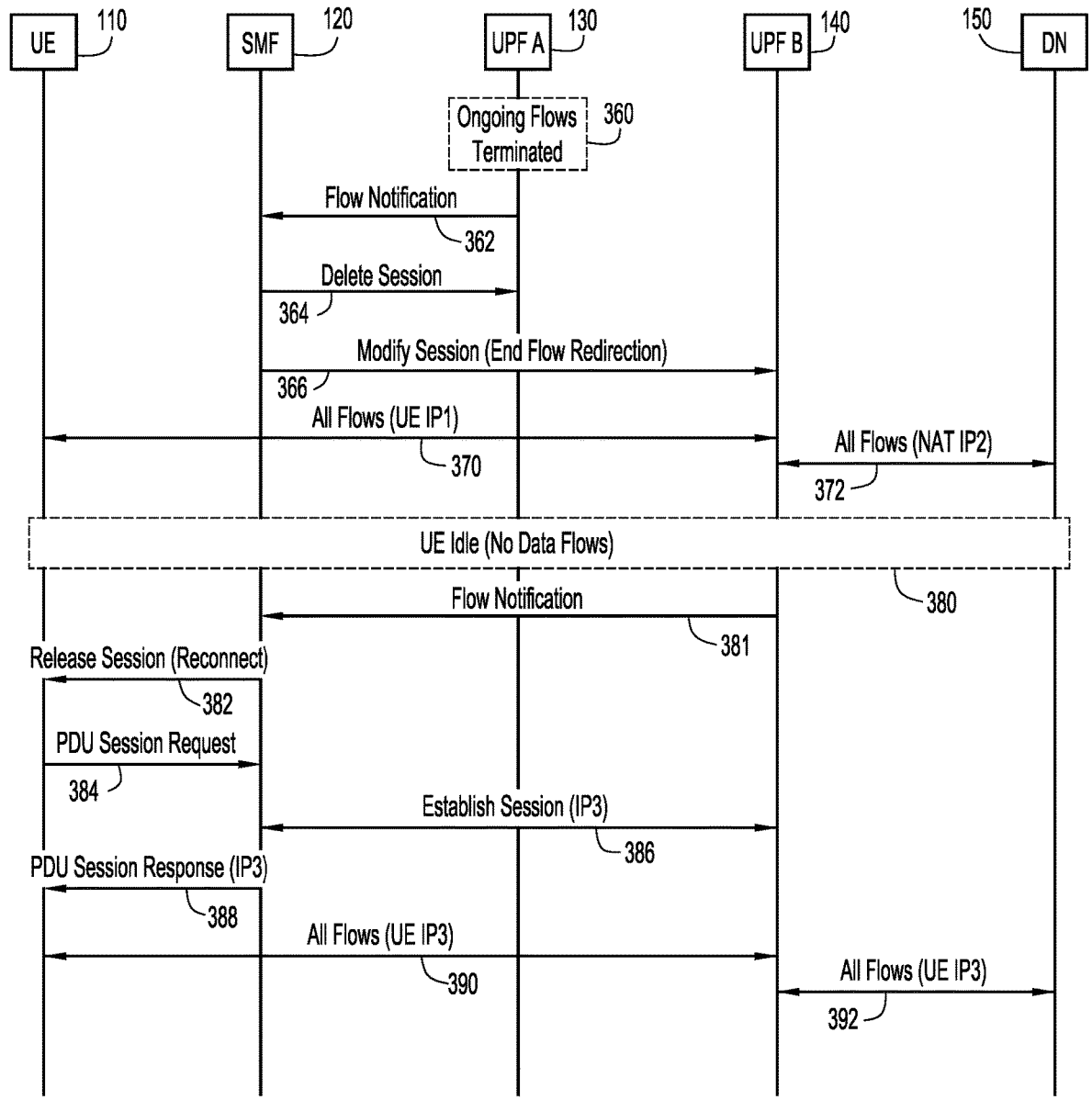
FIG. 3B is a message flow diagram illustrating messages and flows between a UE and a network system to clean up PDU sessions after transitioning the UE to a different UPF, according to an example embodiment.

Referring now to FIG. 3B, a message flow diagram illustrates messages passed in the network system to handle sessions after the UE 110 has transitioned from the UPF 130 to the UPF 140. At 360, the UPF 130 detects that the ongoing flows, i.e., the flows between the UE 110 and the data network 150 that are routed through the UPF 130 and the UPF 140, have ended. In one example, the UPF 130 may detect a message exchange ending a Transport Control Protocol (TCP) data flow, such as a TCP handshake. The UPF 130 sends a notification 362 to the SMF 120 to notify the SMF 120 that the ongoing flows have ended. The SMF 120 sends a message 364 to the UPF 130 directing the UPF 130 to delete the session for the UE 110 on the UPF 130. Additionally, the SMF 120 sends a message 366 to the UPF 140 directing the UPF 140 to remove the forwarding rules for the ongoing flows that have ended. After the UPF 130 and the UPF 140 have been reconfigured by the SMF 120, all of the data flows 370 for the UE 110 are received at the UPF 140. The UPF 140 translates the network address (e.g., IP1) assigned at the UPF 130 to the network address (e.g., IP2) assigned at the UPF 140, and forwards the data flows 372 to the data network 150.

When the UPF 140 detects, at 380, that the UE 110 is idle with no active data flows, the UPF 140 sends a flow notification 381 to the SMF 120. After receiving the flow notification 381, the SMF 120 sends a session release request 382 to the UE 110 with an indication to reconnect. The UE 110 releases the session associated with the temporary network address (e.g., IP2), and sends a PDU session request 384 to the SMF 120. The SMF 120 selects the UPF 140 and sends a message 386 to the UPF 140 directing the UPF 140 to establish a session for the UE 110 associated with a new network address (e.g., IP3). The SMF 120 sends a PDU session response 388 to the UE 110 indicating the associated network address (e.g., IP3) for the UE 110. Once the UE 110 is reconnected to the UPF 140 with the new session, all of the data flows 390 are received at the UPF 140 with the new network address (e.g., IP3), and are forwarded to the data network 150 as data flows 392 using the same network address (e.g., IP3) without any need for the NAT service 190 in the UPF 140.

Figure 4:
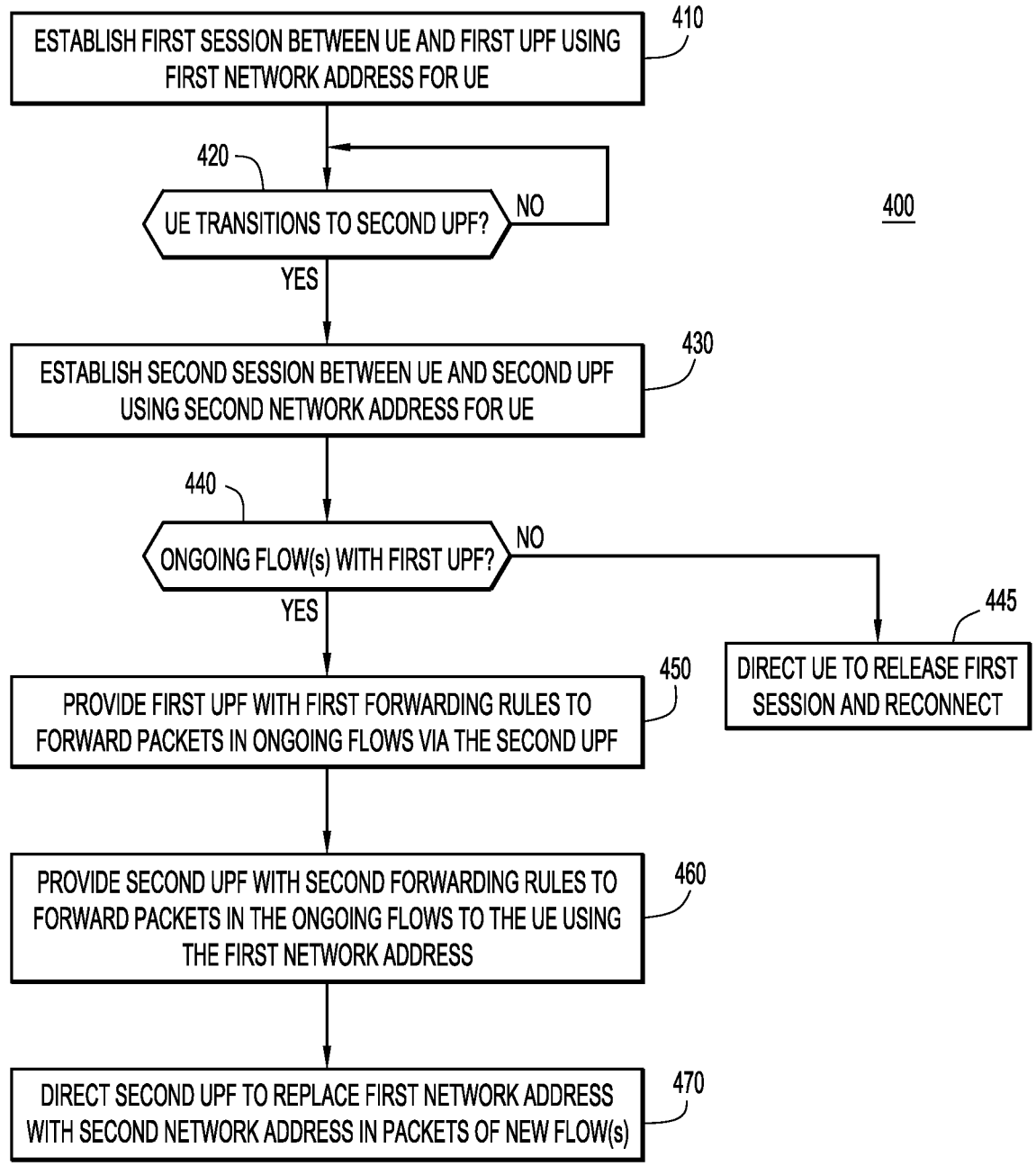
FIG. 4 is a flowchart illustrating operations performed at a Session Management Function (SMF) to transition a UE from a first UPF to a second UPF, according to an example embodiment.

Referring now to FIG. 4, a flowchart illustrates operations performed by an SMF (e.g., SMF 120) in a process 400 for providing session and service continuity when transitioning a UE from a first UPF to a second UPF. At 410, the SMF establishes a first session between the UE and the first UPF. A first network address is associated with the UE for the first session. At 420, the SMF detects that the UE should transition to a second UPF. In one example, the SMF detects that the UE has changed location and is connected to a different RAN, which is serviced by the second UPF. The SMF establishes a second session between the UE and the second UPF at 430. If there are ongoing flows from the first UPF, the SMF instructs the second UPF to associate a second network address with the UE for the second session, e.g., as a temporary network address used by a NAT service for new flows in the second session.

At 440, the SMF determines whether there are any ongoing flows in the first session with the first UPF. In one example, the SMF may request a session report from the first UPF, which responds with an indication of whether there are any ongoing flows in the first session. If the SMF determines that there are no ongoing flows in the first session, then the SMF directs the UE to release the first session and reconnect at 445. In one example, when the UE reconnects, the SMF selects the second UPF and directs the second UPF to establish the second session with the UE.

If the SMF determines that the first session does include ongoing flows, the SMF provides the first UPF with first forwarding rules to forward packets in the ongoing flows via the second UPF at 450. In one example, the first forwarding rules include filters to identify packets in the ongoing flows and forward downlink traffic to the UE via an N9 interface with the second UPF. The first forwarding rules may also include rules to receive uplink packets in the ongoing flows from the second UPF via the N9 interface.

At 460, the SMF provides the second UPF with second forwarding rules to forward packets in the ongoing flows to the UE using the first network address. In one example, the second forwarding rules include filters to identify packets in the ongoing flows and forward uplink traffic from the UE via an N9 interface with the first UPF. The second forwarding rules may also include rules to receive downlink packets in the ongoing flows from the first UPF via the N9 interface and forward the downlink packets to the UE.

At 470, the SMF directs the second UPF to replace the first network address with the second network address in packets of at least one new flow in the second session. In one example, the SMF directs the second UPF to translate the first network address and the second network address with a NAT service on the second UPF, such the UE sends and receives packets in the new flow(s) with the first network address, but the second UPF uses the second network address to send/receive the packets in the new flow(s) to/from a data network.

Figure 5:
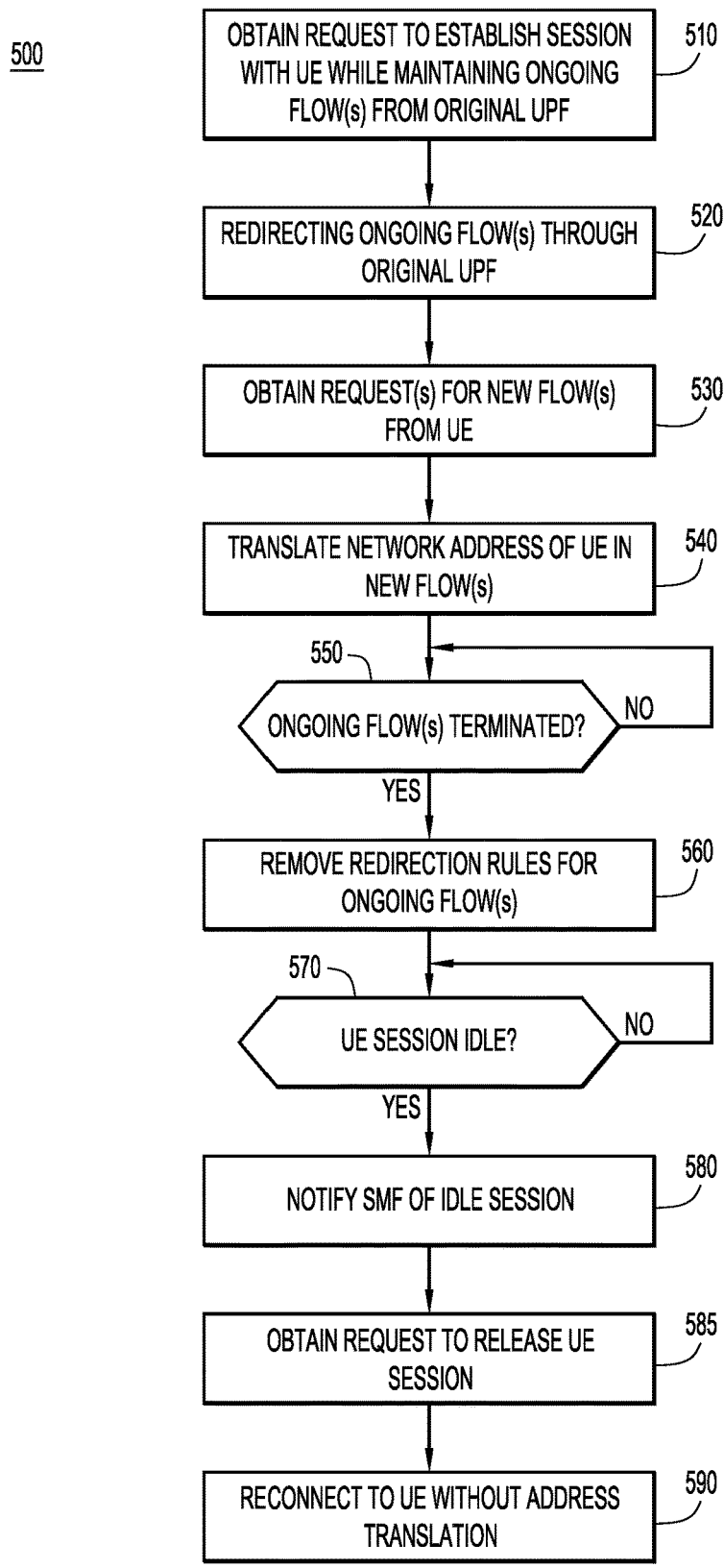
FIG. 5 is a flowchart illustrating operations performed at a UPF to maintain ongoing flows for a UE that transitions to the UPF, according to an example embodiment.

Referring now to FIG. 5, a flowchart illustrates operations performed by a new UPF (e.g., UPF 140) in a process 500 for providing session and service continuity for a UE in a transition to the new UPF from an original UPF. At 510, the new UPF obtains a request to establish a session with a UE while maintaining at least one ongoing flow from the original UPF. In one example, the request may include forwarding rules and filters to identify the ongoing flow(s) and forward the ongoing flow(s) through the original UPF. At 520, the new UPF redirects the ongoing flow(s) through the original UPF. In one example, the new UPF maintains the original network address assigned by the original UPF for the UE.

At 530, the new UPF obtains one or more requests for new flow(s) from the UE. The new UPF handles the new flow(s) at 540 by translating the network address of the UE from the original network address assigned by the original UPF to a temporary network address assigned by the new UPF. In one example, the new UPF provides a NAT service to translate the original network address to the temporary network address.

At 550, the new UPF waits until determining that the ongoing flow(s) have been terminated. In one example, the new UPF may receive a notification from an SMF that the ongoing flow(s) have been terminated. Once the ongoing flow(s) have been terminated, the new UPF removes the redirection rules for the ongoing flow(s) at 560.

At 570, the new UPF waits until determining that the UE session is idle on the new UPF. Once the UE session is idle, i.e., there are no active data flows in the session, the new UPF sends a notification to SMF that the UE session is idle at 580. The new UPF receives a request from the SMF to delete the UE session at 580. The new UPF obtains a release request for the UE session at 585. In one example, the SMF sends a release request to the UE with an indication to reconnect. At 590, the new UPF reconnects to the UE. In one example, when the UE reconnects to the new UPF, the new UPF does not perform the network address translation for new flow(s) as previously performed at 540.

Figure 6:
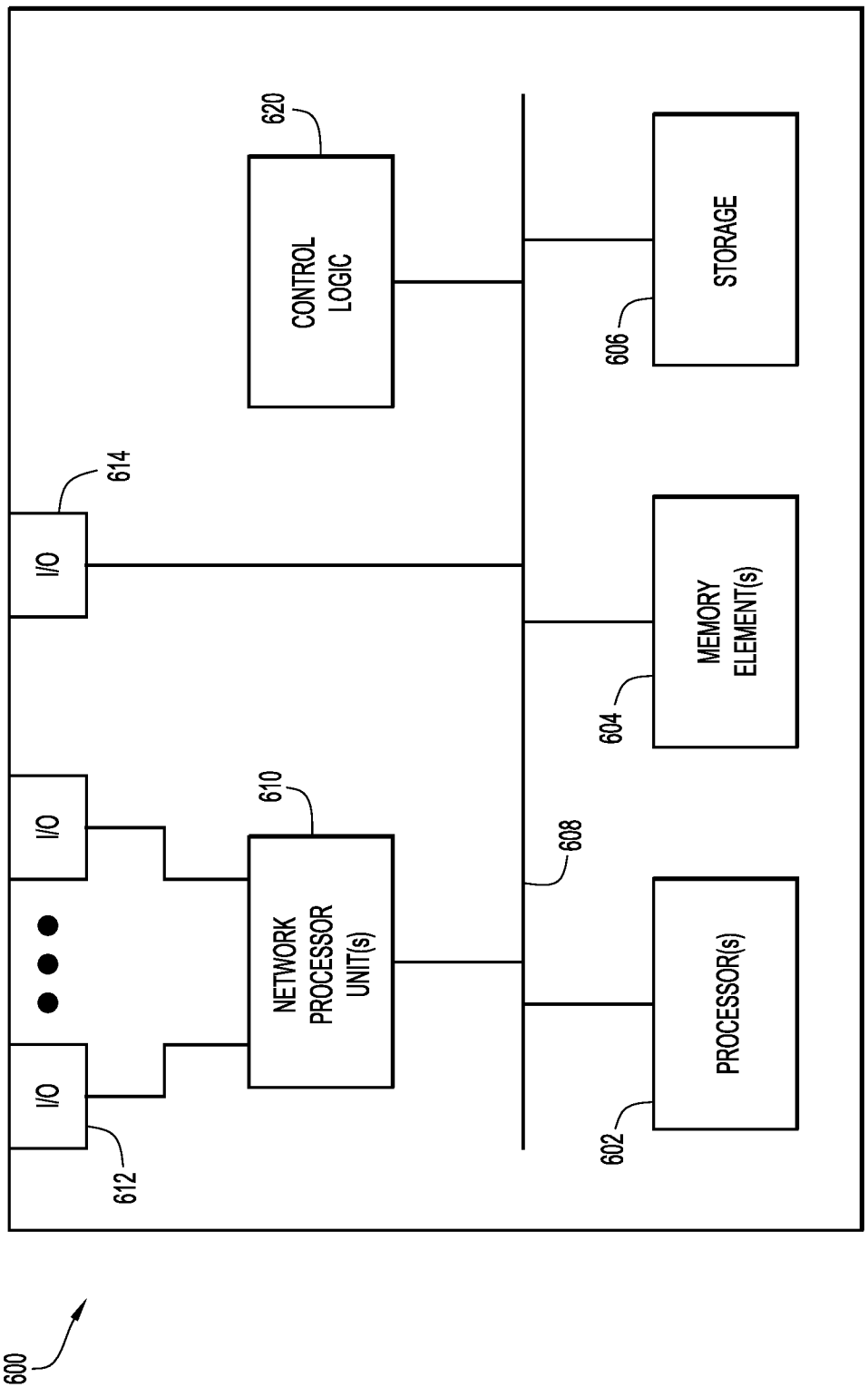
FIG. 6 illustrates a simplified block diagram of a device that may be configured to perform the methods presented herein, according to an example embodiment.

Referring to FIG. 6, FIG. 6 illustrates a hardware block diagram of a computing device 600 that may perform functions associated with operations discussed herein in connection with the techniques depicted in FIGS. 1, 2A, 2B, 3A, 3B, 4 and 5. In various embodiments, a computing device, such as computing device 600 or any combination of computing devices 600, may be configured as any entity/entities as discussed for the techniques depicted in connection with FIGS. 1, 2A, 2B, 3A, 3B, 4 and 5 in order to perform operations of the various techniques discussed herein.

In at least one embodiment, the computing device 600 may include one or more processor(s) 602, one or more memory element(s) 604, storage 606, a bus 608, one or more network processor unit(s) 610 interconnected with one or more network input/output (I/O) interface(s) 612, one or more I/O interface(s) 614, and control logic 620. In various embodiments, instructions associated with logic for computing device 600 can overlap in any manner and are not limited to the specific allocation of instructions and/or operations described herein.

In at least one embodiment, processor(s) 602 is/are at least one hardware processor configured to execute various tasks, operations and/or functions for computing device 600 as described herein according to software and/or instructions configured for computing device 600. Processor(s) 602 (e.g., a hardware processor) can execute any type of instructions associated with data to achieve the operations detailed herein. In one example, processor(s) 602 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 604 and/or storage 606 is/are configured to store data, information, software, and/or instructions associated with computing device 600, and/or logic configured for memory element(s) 604 and/or storage 606. For example, any logic described herein (e.g., control logic 620) can, in various embodiments, be stored for computing device 600 using any combination of memory element(s) 604 and/or storage 606. Note that in some embodiments, storage 606 can be consolidated with memory element(s) 604 (or vice versa), or can overlap/exist in any other suitable manner.

In at least one embodiment, bus 608 can be configured as an interface that enables one or more elements of computing device 600 to communicate in order to exchange information and/or data. Bus 608 can be implemented with any architecture designed for passing control, data and/or information between processors, memory elements/storage, peripheral devices, and/or any other hardware and/or software components that may be configured for computing device 600. In at least one embodiment, bus 608 may be implemented as a fast kernel-hosted interconnect, potentially using shared memory between processes (e.g., logic), which can enable efficient communication paths between the processes.

In various embodiments, network processor unit(s) 610 may enable communication between computing device 600 and other systems, entities, etc., via network I/O interface(s) 612 to facilitate operations discussed for various embodiments described herein. In various embodiments, network processor unit(s) 610 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 600 and other systems, entities, etc. to facilitate operations for various embodiments described herein. In various embodiments, network I/O interface(s) 612 can be configured as one or more Ethernet port(s), Fibre Channel ports, and/or any other I/O port(s) now known or hereafter developed. Thus, the network processor unit(s) 610 and/or network I/O interface(s) 612 may include suitable interfaces for receiving, transmitting, and/or otherwise communicating data and/or information in a network environment.

I/O interface(s) 614 allow for input and output of data and/or information with other entities that may be connected to computer device 600. For example, I/O interface(s) 614 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 620 can include instructions that, when executed, cause processor(s) 602 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 620) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 604 and/or storage 606 can store data, software, code, instructions (e.g., processor instructions), logic, parameters, combinations thereof, and/or the like used for operations described herein. This includes memory element(s) 604 and/or storage 606 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, entities for various embodiments described herein can encompass network elements (which can include virtualized network elements, functions, etc.) such as, for example, network appliances, forwarders, routers, servers, switches, gateways, bridges, loadbalancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

In summary, the techniques presented herein enable an SMF to query a UPF for IP filters to identify ongoing flows. The SMF forms new Packet Detection Rules (PDRs) with filters to identify ongoing flows and installs them on the new UPF so that these ongoing flows continue to be serviced by the old UPF. The session on the new UPF is established with the same IP address that was allocated by the old UPF. A NAT IP address (and port range) are allocated for the session on the new UPF. The old UPF notifies the SMF when the existing flows are terminated, upon which the SMF releases the session on the old UPF. When the session on the new UPF is idle, the SMF disconnects the session (with a Reconnect Required indication) on the new UPF to remove the need for the NAT on the new flows. If the UE moves from the old UPF to the new UPF and there are no existing flows on the old UPF, the SMF may release the session (with a Reconnect Required indication) and establish the reconnected session on the new UPF without the NAT. These techniques do not require the UE to support dual IP addresses and dual PDN sessions since the new UPF maintains the old IP address through the NAT service until the old IP address is no longer necessary.

With the techniques presented herein, UPF chaining through the N9 interface is used only for the duration of existing flows. A single IP address is assigned to the UE, and a NAT'ed IP address may be shared across sessions on the new UPF. These techniques do not block resources on the UPF (e.g., branching point UPF, multiple anchor UPFs) while waiting for the UE to move existing flows to a new IP address, which results in optimal utilization of UPF resources. These techniques make a distinction between active sessions (i.e., with active flows) and idle sessions.

In the techniques described herein, the SMF is notified when to release the session on the old UPF, which removes the non-deterministic nature of validity timers used by traditional systems. These techniques cater to IPv4, IPv6, and IPv4v6 sessions, and may be used with CUPS EPC, 5G SA and/or 5G NSA deployments.

In one form, a method is provided for an SMF to provide session and service continuity for a UE transitioning between a first UPF and a second UPF. The method includes establishing a first session between the UE and the first UPF. The first session is associated with a first network address for the UE. The method also includes determining that the UE transitions to the second UPF and establishing a second session between the UE and the second UPF. The second session is associated with a second network address for the UE. The method further includes querying the first UPF to determine that the UE is participating in at least one ongoing flow in the first session. The method also includes providing the first UPF with first forwarding rules to forward packets in the at least one ongoing flow to the UE via the second UPF, and providing the second UPF with second forwarding rules to forward packets in the at least one ongoing flow to the first UPF with the first network address. The method further includes directing the second UPF to replace the first network address with the second network address in packets of at least one new flow for the UE.

In another form, an apparatus comprising a network interface and a processor is provided. The network interface is configured to communicate with a plurality of computing devices. The processor is coupled to the network interface, and configured to establish a first session between a UE and first UPF. The first session is associated with a first network address for the UE. The processor is also configured to determine that the UE transitions to a second UPF and establish a second session between the UE and the second UPF. The second session is associated with a second network address for the UE. The processor is further configured to cause the network interface to query the first UPF to determine that the UE is participating in at least one ongoing flow in the first session. The processor is configured to cause the network interface to provide the first UPF with first forwarding rules to forward packets in the at least one ongoing flow to the UE via the second UPF. The processor is also configured to cause the network interface to provide the second UPF with second forwarding rules to forward packets in the at least one ongoing flow to the first UPF with the first network address. The processor is further configured to cause the network interface to direct the second UPF to replace the first network address with the second network address in packets of at least one new flow for the UE.

In still another form, a non-transitory computer readable storage media is provided that is encoded with instructions that, when executed by a processor of an SMF device, cause the processor to establish a first session between a UE and a first UPF. The first session is associated with a first network address for the UE. The instructions also cause the processor to determine that the UE transitions to a second UPF and establish a second session between the UE and the second UPF. The second session is associated with a second network address for the UE. The instructions further cause the processor query the first UPF to determine that the UE is participating in at least one ongoing flow in the first session. The instructions cause the processor to provide the first UPF with first forwarding rules to forward packets in the at least one ongoing flow to the UE via the second UPF. The instructions also cause the processor to provide the second UPF with second forwarding rules to forward packets in the at least one ongoing flow to the first UPF with the first network address. The instructions further cause the processor to direct the second UPF to replace the first network address with the second network address in packets of at least one new flow for the UE.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
   establishing a first session between a User Equipment (UE) and a first User Plane Function (UPF), the first session associated with a first network address for the UE;
   determining that the UE transitions to a second UPF;
   establishing a second session between the UE and the second UPF, the second session associated with a second network address for the UE;
   querying the first UPF to determine that the UE is participating in at least one ongoing flow in the first session;
   providing the first UPF with first forwarding rules to forward downlink packets of the at least one ongoing flow to the UE via the second UPF;
   providing the second UPF with second forwarding rules to forward uplink packets of the at least one ongoing flow to the first UPF with the first network address; and
   directing the second UPF to replace the first network address with the second network address in uplink packets of at least one new flow for the UE and downlink packets of the at least one new flow for the UE, the at least one new flow beginning after the UE transitions to the second UPF.

2. The method of claim 1, wherein directing the second UPF to handle the at least one new flow to the UE with the second network address comprises directing the second UPF to translate packets in the at least one new flow from the first network address to the second network address.

3. The method of claim 1, further comprising:
   obtaining a notification from the first UPF that the at least one ongoing flow is terminated;
   removing the first forwarding rules from the first UPF; and
   removing the second forwarding rules from the second UPF.

4. The method of claim 3, wherein the notification that at least one ongoing flow is terminated is based on a Transport Control Protocol (TCP) handshake.

5. The method of claim 3, further comprising:
   obtaining a notification from the second UPF that the at least one new flow is terminated; and
   directing the second UPF to release the second session and establish a third session with the UE, the third session associated with a third network address.

6. The method of claim 1, wherein directing the second UPF to replace the first network address with the second network address comprises directing the second UPF to perform a Network Address Translation (NAT) service on the packets of the at least one new flow such that the UE sends and receives the packets of the at least one new flow using the first network address and the second UPF sends and receives the packets of the at least one new flow using the second network address.

7. The method of claim 1, wherein determining that the UE transitions to the second UPF comprises determining that the UE has moved to an access location associated with the second UPF.

8. An apparatus comprising:
   a network interface configured to communicate with a plurality of computing devices; and
   a processor coupled to the network interface, the processor configured to:
      establish a first session between a User Equipment (UE) and a first User Plane Function (UPF), the first session associated with a first network address for the UE;
      determine that the UE transitions to a second UPF;
      establish a second session between the UE and the second UPF, the second session associated with a second network address for the UE;
      cause the network interface to query the first UPF to determine that the UE is participating in at least one ongoing flow in the first session;
      cause the network interface to provide the first UPF with first forwarding rules to forward downlink packets of the at least one ongoing flow to the UE via the second UPF;
      cause the network interface to provide the second UPF with second forwarding rules to forward uplink packets of the at least one ongoing flow to the first UPF with the first network address; and
      cause the network interface to direct the second UPF to replace the first network address with the second network address in uplink packets of at least one new flow for the UE and downlink packets of the at least one new flow for the UE, the at least one new flow beginning after the UE transitions to the second UPF.

9. The apparatus of claim 8, wherein the processor is configured to cause the network interface to direct the second UPF to handle the at least one new flow to the UE with the second network address by causing the network interface to direct the second UPF to translate packets in the at least one new flow from the first network address to the second network address.

10. The apparatus of claim 8, wherein the processor is further configured to:
    obtain a notification via the network interface from the first UPF that the at least one ongoing flow is terminated;
    cause the network interface to remove the first forwarding rules from the first UPF; and
    cause the network interface to remove the second forwarding rules from the second UPF.

11. The apparatus of claim 10, wherein the notification that the at least one ongoing flow is terminated is based on a Transport Control Protocol (TCP) handshake.

12. The apparatus of claim 10, wherein the processor is further configured to:
obtain a notification via the network interface from the second UPF that the at least one new flow is terminated; and
cause the network interface to direct the second UPF to release the second session and establish a third session with the UE, the third session associated with a third network address.

13. The apparatus of claim 8, wherein the processor is configured to cause the network interface to direct the second UPF to replace the first network address with the second network address by cause the network interface to direct the second UPF to perform a Network Address Translation (NAT) service on the packets of the at least one new flow, such that the UE sends and receives the packets of the at least one new flow using the first network address and the second UPF sends and receives the packets of the at least one new flow using the second network address.

14. The apparatus of claim 8, wherein the processor is configured to determine that the UE transitions to the second UPF by determining that the UE has moved to an access location associated with the second UPF.

15. One or more non-transitory computer readable storage media encoded with software comprising computer executable instructions and, when the software is executed on a processor of a Session Management Function (SMF) device, operable to cause a processor to:
establish a first session between a User Equipment (UE) and a first User Plane Function (UPF), the first session associated with a first network address for the UE;
determine that the UE transitions to a second UPF;
establish a second session between the UE and the second UPF, the second session associated with a second network address for the UE;
query the first UPF to determine that the UE is participating in at least one ongoing flow in the first session;
provide the first UPF with first forwarding rules to forward downlink packets of the at least one ongoing flow to the UE via the second UPF;
provide the second UPF with second forwarding rules to forward uplink packets of the at least one ongoing flow to the first UPF with the first network address; and
direct the second UPF to replace the first network address with the second network address in uplink packets of at least one new flow for the UE and downlink packets of the at least one new flow for the UE, the at least one new flow beginning after the UE transitions to the second UPF.

16. The one or more non-transitory computer readable storage media of claim 15, wherein the software is further operable to cause the processor to direct the second UPF to handle the at least one new flow to the UE with the second network address by directing the second UPF to translate packets in the at least one new flow from the first network address to the second network address.

17. The one or more non-transitory computer readable storage media of claim 15, wherein the software is further operable to cause the processor to:
obtain a notification from the first UPF that the at least one ongoing flow is terminated;
remove the first forwarding rules from the first UPF; and
remove the second forwarding rules from the second UPF.

18. The one or more non-transitory computer readable storage media of claim 15, wherein the software is further operable to cause the processor to:
obtain a notification from the second UPF that the at least one new flow is terminated; and
direct the second UPF to release the second session and establish a third session with the UE, the third session associated with a third network address.

19. The one or more non-transitory computer readable storage media of claim 15, wherein the software is further operable to cause the processor to direct the second UPF to replace the first network address with the second network address by directing the second UPF to perform a Network Address Translation (NAT) service on the packets of the at least one new flow such that the UE sends and receives the packets of the at least one new flow using the first network address and the second UPF sends and receives the packets of the at least one new flow using the second network address.

20. The one or more non-transitory computer readable storage media of claim 15, wherein the software is further operable to cause the processor to determine that the UE transitions to the second UPF by determining that the UE has moved to an access location associated with the second UPF.

* * * * *